Jan. 7, 1941.  E. MARTINSON  2,227,661
LOCKING MEANS FOR HYDRAULIC BRAKE SYSTEMS
Filed June 1, 1939
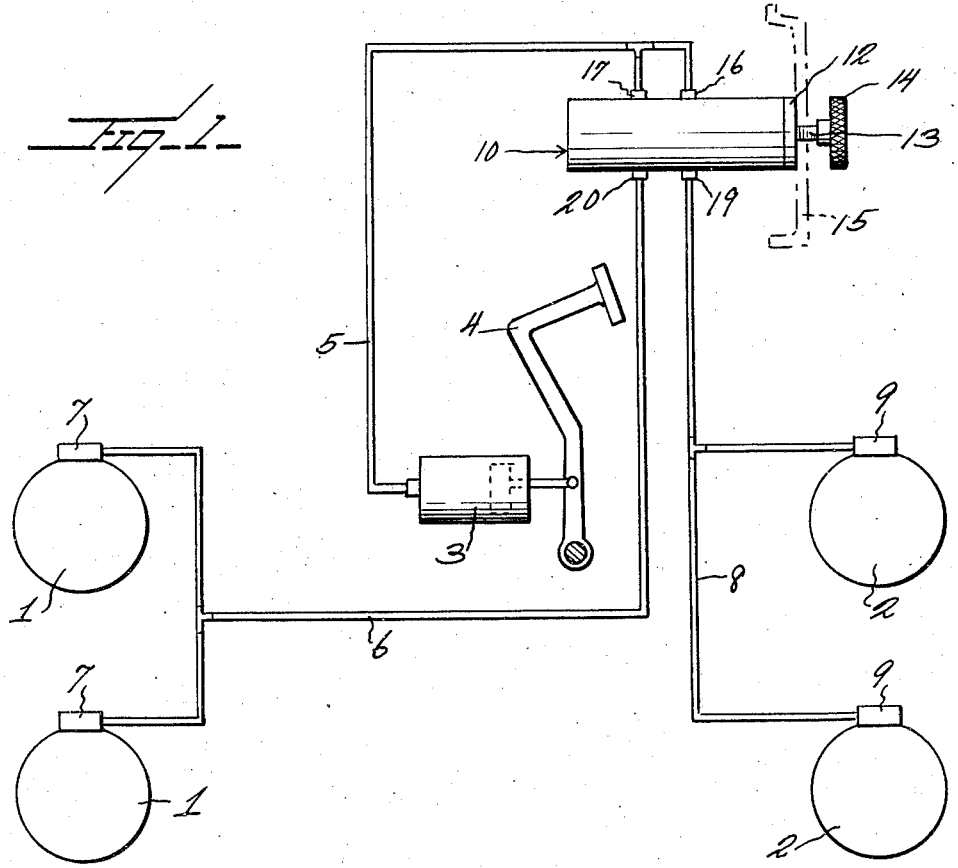
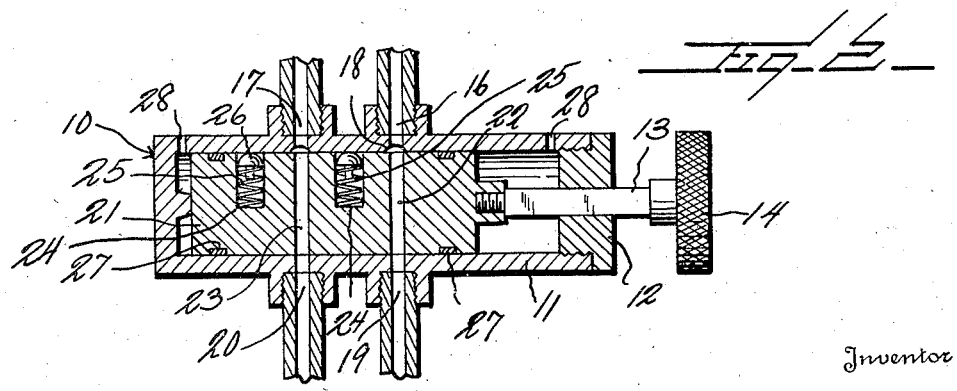
Inventor
E. Martinson
By Watson E. Coleman
Attorney Patented Jan. 7, 1941

2,227,661

UNITED STATES PATENT OFFICE 2,227,661.

LOCKING MEANS FOR HYDRAULIC BRAKE SYSTEMS

Edwin Martinson, Holdrege, Nebr.

Application June 1, 1939, Serial No. 276,921

1 Claim. (Cl. 188—152)

This invention relates generally to the class of fluid or hydraulic braking systems for wheeled vehicles and pertains particularly to improved means for locking such systems.

The primary object of the present invention is to provide in a fluid or hydraulic braking system, a novel means whereby the system may be "locked" or the fluid held against movement therein after the brakes have been set so that the operator of the vehicle may remove his foot from the foot pedal without fear of the brakes releasing and the vehicle moving.

The present device is of particular benefit in hydraulic brake systems where it is necessary to set the brakes when the vehicle is stopped on a grade or when it is necessary to jack up a wheel of the vehicle, particularly where the vehicle is on a grade, and the device also may be employed in place of the regular emergency or hand set brake which at the present time forms a standard part of vehicle braking systems.

Another object of the invention is to provide in a system of the character described, a fluid flow controlling valve of novel design wherein the seepage of fluid through the valve when the latter is closed, is positively prevented.

The invention will be best understood from a consideration of the following detailed description taken in connection with the accompanying drawing forming part of this specification, with the understanding, however, that the invention is not to be confined to any strict conformity with the showing of the drawing but may be changed or modified so long as such changes or modifications mark no material departure from the salient features of the invention as expressed in the appended claim.

In the drawing:

Fig. 1 is a diagram of a fluid brake system showing the device embodying the present invention connected therein.

Fig. 2 is a longitudinal sectional vew of the locking valve.

Referring now more particularly to the drawing, Fig. 1 represents a conventional fluid braking system in which the front wheel brakes are indicated by the numeral 1 and the rear wheelbrakes are indicated by the numeral 2.

The numeral 3 designates the master fluid cylinder which is controlled by the usual foot pedal 4 and which has leading therefrom the fluid line 5.

A fluid line 6 leads to the front brake actuating units 7 while a similar line 8 leads to the rear brake actuating units 9, and between these lines 6 and 8 and the fluid line 5, is interposed the locking or control valve embodying the present invention, the same being generally indicated by the numeral 10.

In accordance with the present invention, the control or locking valve 10 comprises an elongated cylindrical casing 11 which at one end is provided with a packed head 12 through which a piston stem 13 rises, the outer end of the stem having the head 14 thereon. This valve casing 11 is adapted to be mounted in any suitable manner on the vehicle instrument board 15 so that the piston actuating stem 13 and head 14 are accessible to the driver of the vehicle.

The casing 11 is provided with the two bushed inlet ports 16 and 17 which are connected with the master fluid line 5 leading from the cylinder 3 in the manner shown in Fig. 1. At its inner end each of these ports 16 and 17 is formed to provide a ball valve seat 18.

Opposite the ports 16 and 17 are the bushed outlet ports 19 and 20, one of which is connected with the fluid line 18 while the other one is connected with the fluid line 6.

Slidably disposed within the cylinder 11 is a relatively long piston body 21 which has formed transversely therethrough the cross passages 22 and 23 which are designed respectively to establish communication between the ports 16—19 and the ports 17—20, when the piston has been shifted in the proper direction and to the proper extent in the cylinder.

At one side of each transverse passage there is formed in the piston body a recess 24 in which is a spring 25 and a valve ball 26. The ball is constantly urged outwardly by the spring 25 and under normal operating conditions for the brake system it engages against the inner surface of the cylinder wall at one side of an inlet port but when the valve is to be closed to lock the system, the valve ball 26 will be shifted into a seat 18 of an inlet port.

Adjacent each end of the piston 21 is a packing 27 which, of course, is provided to prevent fluid leakage past the ends of the piston and into the ends of the cylinder.

In order that the piston body 21 may be moved freely backwardly and forwardly in the cylinder, air vents 28 are provided in the cylinder wall adjacent the ends of the cylinder.

In the operation of a hydraulic brake system equipped with a locking valve of the character here described, the piston body 21 will be normally in a position where the cross passages 22 will establish the necessary communication between the oppositely disposed inlet and outlet ports. Thus it will be seen that normal actuation of the foot lever 4 can be accomplished to force fluid to the lines 6 and 8 for the operation of the front and rear brake. When it is desired to set the brakes and leave them in locked or applied condition, the operator of the vehicle after actuating the foot lever in the customary manner to apply the brakes then pulls the piston body 21 rearwardly or in a direction to shift the valve balls 26 onto the seats 18. This will effectively block the return of fluid through the lines 6 and 8 to the master cylinder when the foot pedal 6 has been released. Thus it will be seen that the vehicle may be left with the full assurance that the brakes will be securely applied so that even though the vehicle may be on a grade, it will not shift from its position.

What is claimed is:

In a hydraulic brake system locking means for a motor vehicle having a dash and front and rear pairs of brake operating fluid actuated pistons and a foot lever controlled master fluid cylinder, a single pipe line leading from said master cylinder, a pair of pipe lines coupled with and leading from said single line, one of the pipe lines of said pair being connected by a pair of branch pipes with cylinders for the front brake operating pistons, the other pipe line of said pair being connected through two branch lines with the cylinders for the rear brake operating pistons, and a hand controlled valve for said pair of pipe lines mounted on said dash, comprising a shell having two inlet ports and two outlet ports, the shell being connected across and interposed in the pair of pipe lines and having each inlet port connected with one side of one of the pair of pipe lines and having each outlet port connected with the other side of one of the pair of pipe lines, and a reciprocable plug in said shell having a pair of passages formed transversely therethrough and arranged to simultaneously establish communication between the pairs of inlet and outlet ports when the plug is in one position and to shut off communication between the pairs of inlet and outlet ports when the plug is in another position, said plug operating entirely independently of the master cylinder operating means and when in shut-off position, holding said brake actuating pistons in brake applied position when the master cylinder controlling lever is released.

EDWIN MARTINSON.